United States Patent
Yang

(10) Patent No.: US 10,893,573 B2
(45) Date of Patent: Jan. 12, 2021

(54) D2D COMMUNICATION METHOD, REMOTE USER EQUIPMENT, AND RELAY USER EQUIPMENT

(71) Applicant: Guangdong OPPO Mobile Telecommunications Corp., Ltd., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/605,678

(22) PCT Filed: Apr. 28, 2017

(86) PCT No.: PCT/CN2017/082486
§ 371 (c)(1),
(2) Date: Oct. 16, 2019

(87) PCT Pub. No.: WO2018/195947
PCT Pub. Date: Nov. 1, 2018

(65) Prior Publication Data
US 2020/0120745 A1 Apr. 16, 2020

(51) Int. Cl.
*H04W 76/28* (2018.01)
*H04W 8/00* (2009.01)
*H04W 76/27* (2018.01)
*H04W 88/06* (2009.01)

(52) U.S. Cl.
CPC .......... *H04W 76/28* (2018.02); *H04W 8/005* (2013.01); *H04W 76/27* (2018.02); *H04W 88/06* (2013.01)

(58) Field of Classification Search
CPC ..... H04W 76/28; H04W 8/005; H04W 76/27; H04W 88/06
USPC ..................................................... 455/11.1, 7
See application file for complete search history.

(56) References Cited

U.S. PATENT DOCUMENTS

| 9,020,540 | B2 * | 4/2015 | Karampatsis ........... H04W 4/70 |
|---|---|---|---|
| | | | 455/458 |
| 9,369,946 | B2 * | 6/2016 | Plicanic Samuelsson ................... |
| | | | H04W 48/14 |
| 9,668,234 | B2 * | 5/2017 | Karampatsis ......... H04W 68/00 |
| 9,668,236 | B2 * | 5/2017 | Ryu ..................... H04W 68/00 |

(Continued)

FOREIGN PATENT DOCUMENTS

| CN | 102204392 A | 9/2011 |
|---|---|---|
| CN | 104717714 A | 6/2015 |

(Continued)

OTHER PUBLICATIONS

Extended EP Search Report for EP application No. 17907186.5 filed Feb. 24, 2020.

(Continued)

*Primary Examiner* — Hai V Nguyen

(57) ABSTRACT

A D2D communication method, a remote user equipment, and a relay user equipment are provided. The method includes: receiving, by a remote user equipment, a D2D discovery message sent by a relay user equipment and acquiring a discontinuous reception parameter of the relay user equipment; and sending a communication request message to the relay user equipment based on the discontinuous reception parameter of the relay user equipment.

14 Claims, 6 Drawing Sheets

(56) References Cited

U.S. PATENT DOCUMENTS

| | | | | |
|---|---|---|---|---|
| 9,807,811 B2* | 10/2017 | Jung | H04W 48/16 |
| 9,843,992 B2* | 12/2017 | Thangarasa | H04W 48/16 |
| 9,900,810 B2* | 2/2018 | Jung | H04W 36/0072 |
| 9,924,503 B2* | 3/2018 | Kim | H04W 74/0833 |
| 9,967,850 B2* | 5/2018 | Jung | H04W 8/005 |
| 9,992,652 B2* | 6/2018 | Baghel | H04W 76/14 |
| 10,085,242 B2* | 9/2018 | Fujishiro | H04W 76/14 |
| 10,123,359 B2* | 11/2018 | Jung | H04W 76/10 |
| 10,123,376 B2* | 11/2018 | Siomina | H04W 76/20 |
| 10,129,898 B2* | 11/2018 | Seo | H04W 72/02 |
| 10,154,510 B2* | 12/2018 | Huang | H04W 4/80 |
| 10,172,165 B2* | 1/2019 | Yi | H04J 11/00 |
| 10,212,642 B2* | 2/2019 | Li | H04W 76/14 |
| 10,306,599 B2* | 5/2019 | Agiwal | H04W 72/04 |
| 10,405,364 B2* | 9/2019 | Jung | H04W 8/005 |
| 10,411,789 B2* | 9/2019 | Loehr | H04W 72/1263 |
| 10,425,915 B2* | 9/2019 | Sheng | H04W 76/14 |
| 10,485,057 B2* | 11/2019 | Ashworth | H04W 88/04 |
| 10,499,222 B2* | 12/2019 | Adachi | H04W 4/70 |
| 10,506,491 B2* | 12/2019 | Lee | H04W 40/22 |
| 10,512,120 B2* | 12/2019 | Ashworth | H04W 88/04 |
| 10,516,986 B2* | 12/2019 | Lee | H04W 4/70 |
| 10,588,031 B2* | 3/2020 | Lee | H04W 76/20 |
| 10,595,184 B2* | 3/2020 | Li | H04W 72/0406 |
| 2012/0040700 A1* | 2/2012 | Gomes | H04W 8/186 455/500 |
| 2012/0252517 A1* | 10/2012 | Karampatsis | H04W 76/28 455/515 |
| 2013/0229931 A1* | 9/2013 | Kim | H04W 48/08 370/252 |
| 2013/0286848 A1* | 10/2013 | Xu | H04B 7/14 370/241 |
| 2013/0286912 A1 | 10/2013 | Xu et al. | |
| 2014/0133332 A1* | 5/2014 | Lee | H04W 48/08 370/252 |
| 2014/0198708 A1* | 7/2014 | Lee | H04W 76/14 370/312 |
| 2014/0248915 A1* | 9/2014 | Chandramouli | H04W 4/08 455/458 |
| 2015/0230198 A1* | 8/2015 | Karampatsis | H04W 60/04 455/458 |
| 2015/0282132 A1* | 10/2015 | Kim | H04W 4/08 370/329 |
| 2015/0382324 A1* | 12/2015 | Sheng | H04W 72/02 370/329 |
| 2016/0080920 A1* | 3/2016 | Baghel | H04W 4/90 455/404.1 |
| 2016/0212793 A1* | 7/2016 | Jung | H04W 36/0016 |
| 2016/0242220 A1* | 8/2016 | Jung | H04W 8/005 |
| 2016/0242221 A1* | 8/2016 | Jung | H04W 72/0453 |
| 2016/0286385 A1* | 9/2016 | Ryu | H04W 76/28 |
| 2016/0286601 A1* | 9/2016 | Siomina | H04W 28/0278 |
| 2016/0309377 A1* | 10/2016 | Jung | H04W 76/23 |
| 2016/0330676 A1* | 11/2016 | Thangarasa | H04W 76/14 |
| 2016/0337936 A1* | 11/2016 | Li | H04W 76/14 |
| 2017/0013576 A1* | 1/2017 | Jung | H04W 76/11 |
| 2017/0013640 A1* | 1/2017 | Loehr | H04W 76/14 |
| 2017/0013648 A1* | 1/2017 | Jung | H04W 76/10 |
| 2017/0041773 A1* | 2/2017 | Fujishiro | H04W 76/14 |
| 2017/0188375 A1* | 6/2017 | Seo | H04W 72/02 |
| 2017/0230941 A1* | 8/2017 | Agiwal | H04W 72/048 |
| 2017/0303240 A1* | 10/2017 | Basu Mallick | H04W 72/02 |
| 2017/0339660 A1* | 11/2017 | Kazmi | H04B 17/309 |
| 2018/0041885 A1* | 2/2018 | Li | H04W 8/005 |
| 2018/0048986 A1* | 2/2018 | Adachi | H04W 76/14 |
| 2018/0069618 A1* | 3/2018 | Loehr | H04W 72/1263 |
| 2018/0084478 A1* | 3/2018 | Lee | H04W 40/12 |
| 2018/0098274 A1* | 4/2018 | Thangarasa | H04W 48/20 |
| 2018/0110037 A1* | 4/2018 | Yasukawa | H04W 76/14 |
| 2018/0115362 A1* | 4/2018 | Yasukawa | H04W 40/22 |
| 2018/0176850 A1* | 6/2018 | Phan | H04W 40/22 |
| 2018/0227736 A1* | 8/2018 | Lee | H04W 36/08 |
| 2018/0234862 A1* | 8/2018 | Lee | H04W 76/20 |
| 2018/0234919 A1* | 8/2018 | Tsuda | H04W 52/0216 |
| 2019/0037623 A1* | 1/2019 | Jung | H04W 76/14 |
| 2019/0045440 A1* | 2/2019 | Wu | H04W 52/0225 |
| 2019/0090198 A1* | 3/2019 | Zhao | H04W 8/005 |
| 2019/0116626 A1* | 4/2019 | Zhao | H04W 8/005 |
| 2019/0159018 A1* | 5/2019 | Basu Mallick | H04W 4/023 |
| 2019/0239170 A1* | 8/2019 | Thangarasa | H04W 52/365 |
| 2019/0357216 A1* | 11/2019 | Jung | H04W 72/0453 |
| 2019/0373647 A1* | 12/2019 | Rugeland | H04W 76/10 |
| 2019/0387498 A1* | 12/2019 | Li | H04W 68/00 |
| 2020/0015192 A1* | 1/2020 | Chun | H04W 60/00 |
| 2020/0029299 A1* | 1/2020 | Kuang | H04W 48/08 |
| 2020/0037136 A1* | 1/2020 | Adachi | H04W 8/005 |
| 2020/0068380 A1* | 2/2020 | Wallentin | H04W 68/005 |
| 2020/0077253 A1* | 3/2020 | Kim | H04W 76/14 |
| 2020/0127768 A1* | 4/2020 | Seo | H04L 5/0035 |

FOREIGN PATENT DOCUMENTS

| | | |
|---|---|---|
| CN | 104936294 A | 9/2015 |
| EP | 3354081 B1 | 11/2019 |
| RU | 2015134358 A | 2/2017 |
| WO | 2015126725 A1 | 8/2015 |
| WO | 2016163430 A1 | 10/2016 |
| WO | 2016182375 A1 | 11/2016 |
| WO | 2017050586 A1 | 3/2017 |

OTHER PUBLICATIONS

3GPP TSG-RAN WG2 Meeting #97bis; Spokane, USA, Apr. 3-7, 2017; R2-1703593.

3GPP TSG RAN Meeting #72 RP-161224; Busan, Korea, Jun. 13-16, 2016.

English translation of RU Office Action for RU Application 2019137074 dated Jun. 26, 2020.

* cited by examiner

D2D COMMUNICATION METHOD, REMOTE USER EQUIPMENT, AND RELAY USER EQUIPMENT

CROSS-REFERENCE TO RELATED APPLICATION(S)

This application is a 371 application of International Application No. PCT/CN2017/082486, filed on Apr. 28, 2017, the entire disclosure of which is hereby incorporated by reference.

TECHNICAL FIELD

The present disclosure relates to the technical field of communication, in particular to a D2D communication method, a remote user equipment, and a relay user equipment.

BACKGROUND

With rapid popularization of intelligent terminals and explosive growth of network communication capacities, a demand for evolution of 5th Generation (5G) oriented wireless communication technology is more clear and urgent, and has begun to receive great attention from the industry. In evolution of 5G-oriented wireless communication technology, on the one hand, traditional wireless communication performance indicators, such as network capacity and spectrum efficiency, need to be consecutively improved to further improve a limited and increasingly tight wireless spectrum utilization rate; on the other hand, richer communication modes and resulting enhancement of terminal-user experience and expansion of cellular communication applications are also an evolution direction to be considered. As a key candidate technology for 5G, Device-to-Device (D2D) communication has potential to improve system performance, enhance user experience, and expand cellular communication applications, and has attracted extensive attention.

In the Release-13 standard formulated by the Third Generation Partnership Project (3GPP), in a process of a User Equipment (UE) to network relay, a Remote UE is invisible on an access network side. The establishment of a connection between the Remote UE and a Relay UE usually requires acts of D2D discovery, D2D communication connection establishment, and Internet Protocol (IP) address allocation. However, in a process of full duplex D2D (FeD2D) in the Release-14, that is, an enhanced process of UE-to-network relay, the FeD2D based on D2D technology further expands existing UE-to-network relay capability of the Release-13, changing from Layer 3 Relay to Layer 2 Relay, which means that the Remote UE is visible on the access network side, and a base station stores UE contexts of the Relay UE and the Remote UE. Meanwhile, the traditional Radio Resource Control (RRC) connection directly connected via a Uu port is further expanded to an RRC connection supporting relay via a PC5 port, which means that the traditional RRC connection management method needs further enhancement. For the FeD2D, low power consumption is a key optimization goal. In the traditional D2D communication technology, a cycle of a resource pool used for D2D discovery is generally configured to be long (in seconds) and thus power consumption is low. However, for the FeD2D and Vehicle-to-Everything (V2X) communications, a cycle of a resource pool of the communications is short (for V2X, the resource pool may be continuously distributed in a time domain) and thus power consumption is higher. Therefore, further optimization is needed.

SUMMARY

Implementations of the present disclosure provide a D2D communication method, a remote user equipment, and a relay user equipment.

A first aspect of the implementation of the present disclosure provides a D2D communication method, including: receiving, by a remote user equipment, a D2D discovery message sent by a relay user equipment, and acquiring a discontinuous reception parameter of the relay user equipment; and sending a communication request message to the relay user equipment based on the discontinuous reception parameter of the relay user equipment.

In one possible implementation, the receiving, by the remote user equipment, the D2D discovery message sent by the relay user equipment, and acquiring the discontinuous reception parameter of the relay user equipment, includes: acquiring, by the remote user equipment, a layer 2 user identification of the relay user equipment contained in the D2D discovery message, and determining the discontinuous reception parameter of the relay user equipment through the layer 2 user identification of the relay user equipment; or determining the discontinuous reception parameter of the relay user equipment through a preset field value contained in the D2D discovery message; or determining the discontinuous reception parameter of the relay user equipment through information of discontinuous reception explicitly broadcast in the D2D discovery message.

In one possible implementation, the acquiring, by the remote user equipment, the layer 2 user identification of the relay user equipment contained in the D2D discovery message, includes: receiving, by the remote user equipment, a UE-to-Network Relay Discovery Announcement message broadcast by the relay user equipment, and acquiring the layer 2 user identification of the relay user equipment; or sending, by the remote user equipment, a UE-to-network Relay Discovery Solicitation message to the relay user equipment, receiving a UE-to-network relay discovery response message replied by the relay user equipment, and acquiring the layer 2 user identification of the relay user equipment.

In one possible implementation, the determining the discontinuous reception parameter of the relay user equipment through the layer 2 user identification of the relay user equipment, includes: determining a discontinuous transmission start offset value based on any of the following manners: the discontinuous transmission start offset value is equal to the layer 2 user identification of the relay user equipment; the discontinuous transmission start offset value is acquired by modulo of the layer 2 user identification of the remote user equipment with a preset value.

In one possible implementation, the determining the discontinuous reception parameter of the relay user equipment through the layer 2 user identification of the relay user equipment, includes: using a discontinuous reception configuration of a cellular network or using a discontinuous reception configuration specified by a network; and by modulo of the layer 2 user identification of the relay user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

In one possible implementation, the communication request message includes related information of a discontinuous reception parameter of the remote user equipment; and the method further includes: receiving, by the remote user equipment, a communication acceptance message sent by the relay user equipment after the relay user equipment determines the discontinuous reception parameter of the remote user equipment.

A second aspect of the implementation of the present disclosure provides a D2D communication method, including: receiving, by a relay user equipment, a communication request message sent by a remote user equipment and acquiring related information of a discontinuous reception parameter of the remote user equipment; determining the discontinuous reception parameter of the remote user equipment according to the communication request message; and sending a communication request acceptance message to the remote user equipment based on the discontinuous reception parameter of the remote user equipment.

In one possible implementation, the determining the discontinuous reception parameter of the remote user equipment according to the communication request message, includes: acquiring, by the relay user equipment, a layer 2 user identification of the remote user equipment contained in the communication request message, and determining the discontinuous reception parameter of the remote user equipment through the layer 2 user identification of the remote user equipment; or determining the discontinuous reception parameter of the remote user equipment through preset information contained in the communication request message; or determining the discontinuous reception parameter of the remote user equipment through information of a discontinuous transmission explicitly broadcast in the communication request message.

In one possible implementation, the determining the discontinuous reception parameter of the remote user equipment through the layer 2 user identification of the remote user equipment, includes: determining a discontinuous transmission start offset value based on any of the following manners: the discontinuous transmission start offset value is equal to the layer 2 user identification of the remote user equipment; the discontinuous transmission start offset value is acquired by modulo of the layer 2 user identification of the remote user equipment with a preset value.

In one possible implementation, the determining the discontinuous reception parameter of the remote user equipment through the layer 2 user identification of the remote user equipment, includes: using a discontinuous reception configuration of a cellular network or using a discontinuous reception configuration specified by a network; and by modulo of the layer 2 user identification of the remote user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

In one possible implementation, before the relay user equipment receives the communication request message sent by the remote user equipment, the method further includes: sending, by the relay user equipment, a D2D discovery message to the remote user equipment, wherein the D2D discovery message contains related information of a discontinuous reception parameter of the relay user equipment.

In one possible implementation, after the remote user equipment and the relay user equipment both acquire a discontinuous transmission parameter of the other, the method further includes: reconfiguring, by the relay user equipment, the discontinuous reception parameter of the relay user equipment and/or reconfiguring the discontinuous reception parameter of the remote user equipment; sending the reconfigured discontinuous reception parameter of the relay user equipment and/or the reconfigured discontinuous reception parameter of the remote user equipment to the remote user equipment; and performing information transmission with the remote user equipment based on the reconfigured discontinuous reception parameter of the relay user equipment and/or the reconfigured discontinuous reception parameter of the remote user equipment.

A third aspect of the implementation of the present disclosure provides a remote user equipment, including: a receiving unit, used for receiving a D2D discovery messages sent by a relay user equipment; a processing unit, used for acquiring a discontinuous reception parameter of the relay user equipment according to the D2D discovery message; and a sending unit, used for sending a communication request message to the relay user equipment based on the discontinuous reception parameter of the relay user equipment.

In one possible implementation, when acquiring the discontinuous reception parameter of the relay user equipment, the processing unit is specifically used for: acquiring a layer 2 user identification of the relay user equipment contained in the D2D discovery message, and determining the discontinuous reception parameter of the relay user equipment through the layer 2 user identification of the relay user equipment; or determining the discontinuous reception parameter of the relay user equipment through a preset field value contained in the D2D discovery message; or determining the discontinuous reception parameter of the relay user equipment through information of discontinuous reception explicitly broadcast in the D2D discovery message.

In one possible implementation, when acquiring the layer 2 user identification of the relay user equipment contained in the D2D discovery message, the receiving unit is specifically used for: receiving a UE-to-Network Relay Discovery Announcement message broadcast by the relay user equipment, and acquiring the layer 2 user identification of the relay user equipment; or the sending unit is specifically used for sending a UE-to-network Relay Discovery Solicitation message to the relay user equipment, and the receiving unit is specifically used for receiving a UE-to-network relay discovery response message replied by the relay user equipment and acquiring the layer 2 user identification of the relay user equipment.

In one possible implementation, when determining the discontinuous reception parameter of the relay user equipment through the layer 2 user identification of the relay user equipment, the processing unit is specifically used for: determining a discontinuous transmission start offset value based on any of the following manners: the discontinuous transmission start offset value is equal to the layer 2 user identification of the relay user equipment; the discontinuous transmission start offset value is acquired by modulo of the layer 2 user identification of the remote user equipment with a preset value.

In one possible implementation, when determining the discontinuous reception parameter of the relay user equipment through the layer 2 user identification of the relay user equipment, the processing unit is specifically used for: using a discontinuous reception configuration of a cellular network or using a discontinuous reception configuration specified by a network; and by modulo of the layer 2 user identification of the relay user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

In one possible implementation, the communication request message includes related information of a discontinuous reception parameter of the remote user equipment; the receiving unit is further used for receiving a communication acceptance message sent by the relay user equipment after the relay user equipment determines the discontinuous reception parameter of the remote user equipment.

A fourth aspect of the implementation of the present disclosure provides a remote user equipment, including: a processor, a memory, a transceiver, and a bus, wherein the processor, the memory, and the transceiver are connected through the bus, wherein the transceiver is used for receiving and sending signals and communicating with a relay user equipment, the memory is used for storing a group of program codes, and the processor is used for calling the program codes stored in the memory to perform the following operations: receiving a D2D discovery message sent by the relay user equipment through the transceiver to acquire a discontinuous reception parameter of the relay user equipment; and sending a communication request message to the relay user equipment through the transceiver based on the discontinuous reception parameter of the relay user equipment.

In one possible implementation, when acquiring the discontinuous reception parameter of the relay user equipment, the processor is specifically used for: acquiring a layer 2 user identification of the relay user equipment contained in the D2D discovery message, and determining the discontinuous reception parameter of the relay user equipment through the layer 2 user identification of the relay user equipment; or determining the discontinuous reception parameter of the relay user equipment through a preset field value contained in the D2D discovery message; or determining the discontinuous reception parameter of the relay user equipment through information of discontinuous reception explicitly broadcast in the D2D discovery message.

In one possible implementation, when acquiring the layer 2 user identification of the relay user equipment contained in the D2D discovery message, the processor is specifically used for: receiving a UE-to-Network Relay Discovery Announcement message broadcast by the relay user equipment through the transceiver and acquiring the layer 2 user identification of the relay user equipment; or sending a UE-to-network Relay Discovery Solicitation message to the relay user equipment through the transceiver, receiving a UE-to-network relay discovery response message replied by the relay user equipment, and acquiring the layer 2 user identification of the relay user equipment.

In one possible implementation, when determining the discontinuous reception parameter of the relay user equipment through the layer 2 user identification of the relay user equipment, the processor is specifically used for: determining a discontinuous transmission start offset value based on any of the following manners: the discontinuous transmission start offset value is equal to the layer 2 user identification of the relay user equipment; the discontinuous transmission start offset value is acquired by modulo of the layer 2 user identification of the remote user equipment with a preset value.

In one possible implementation, when determining the discontinuous reception parameter of the relay user equipment through the layer 2 user identification of the relay user equipment, the processor is specifically used for: using a discontinuous reception configuration of a cellular network or using a discontinuous reception configuration specified by a network; and by modulo of the layer 2 user identification of the relay user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

In one possible implementation, the communication request message includes related information of a discontinuous reception parameter of the remote user equipment; the processor is further used for: receiving a communication acceptance message sent by the relay user equipment after the relay user equipment determines the discontinuous reception parameter of the remote user equipment through the transceiver.

A fifth aspect of the implementation of the present disclosure provides a relay user equipment, including: a receiving unit, used for receiving a communication request message sent by a remote user equipment and acquiring related information of a discontinuous reception parameter of the remote user equipment; a processing unit, used for determining the discontinuous reception parameter of the remote user equipment according to the communication request message; and a sending unit, used for sending a communication request acceptance message to the remote user equipment based on the discontinuous reception parameter of the remote user equipment.

In one possible implementation, when determining the discontinuous reception parameter of the remote user equipment according to the communication request message, the processing unit is specifically used for: acquiring a layer 2 user identification of the remote user equipment contained in the communication request message, and determining the discontinuous reception parameter of the remote user equipment through the layer 2 user identification of the remote user equipment; or determining the discontinuous reception parameter of the remote user equipment through preset information contained in the communication request message; or determining the discontinuous reception parameter of the relay user equipment through information of a discontinuous transmission explicitly broadcast in the communication request message.

In one possible implementation, when determining the discontinuous reception parameter of the remote user equipment through the layer 2 user identification of the remote user equipment, the processing unit is specifically used for: determining a discontinuous transmission start offset value based on any of the following manners: the discontinuous transmission start offset value is equal to the layer 2 user identification of the remote user equipment; the discontinuous transmission start offset value is acquired by modulo of the layer 2 user identification of the remote user equipment with a preset value.

In one possible implementation, when determining the discontinuous reception parameter of the remote user equipment through the layer 2 user identification of the remote user equipment, the processing unit is specifically used for:

using a discontinuous reception configuration of a cellular network or using a discontinuous reception configuration specified by a network; and by modulo of the layer 2 user identification of the remote user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

In one possible implementation, before the receiving unit receives the communication request message sent by the remote user equipment, the sending unit is further used for sending a D2D discovery message to the remote user equipment, wherein the D2D discovery message contains related information of the discontinuous reception parameter of the relay user equipment.

In one possible implementation, after both the remote user equipment and the relay user equipment acquire the discontinuous transmission parameter of the other party, the processing unit is further used for reconfiguring the discontinuous reception parameter of the relay user equipment and/or reconfiguring the discontinuous reception parameter of the remote user equipment.

The sending unit is further used for sending the reconfigured discontinuous reception parameter of the relay user equipment and/or the reconfigured discontinuous reception parameter of the remote user equipment to the remote user equipment.

The receiving unit and the sending unit are further used for performing information transmission with the remote user equipment based on the reconfigured discontinuous reception parameter of the relay user equipment and/or the reconfigured discontinuous reception parameter of the remote user equipment.

A sixth aspect of the present disclosure provides a relay user equipment, including: a processor, a memory, a transceiver, and a bus, wherein the processor, the memory, and the transceiver are connected through the bus, wherein the transceiver is used for receiving and sending signals and communicating with a remote user equipment, the memory is used for storing a group of program codes, and the processor is used for calling the program codes stored in the memory to perform the following operations: receiving a communication request message sent by the remote user equipment through the transceiver, and acquiring related information of a discontinuous reception parameter of the remote user equipment; determining the discontinuous reception parameter of the remote user equipment according to the communication request message; and sending a communication request acceptance message to the remote user equipment through the transceiver based on the discontinuous reception parameter of the remote user equipment.

In one possible implementation, when determining the discontinuous reception parameter of the remote user equipment according to the communication request message, the processor is specifically used for: acquiring a layer 2 user identification of the remote user equipment contained in the communication request message, and determining the discontinuous reception parameter of the remote user equipment through the layer 2 user identification of the remote user equipment; or determining the discontinuous reception parameter of the remote user equipment through preset information contained in the communication request message; or determining the discontinuous reception parameter of the relay user equipment through information of a discontinuous transmission explicitly broadcast in the communication request message.

In one possible implementation, when determining the discontinuous reception parameter of the remote user equipment through the layer 2 user identification of the remote user equipment, the processor is specifically used for: determining the discontinuous transmission start offset value based on any of the following manners: the discontinuous transmission start offset value is equal to the layer 2 user identification of the remote user equipment; the discontinuous transmission start offset value is acquired by modulo of the layer 2 user identification of the remote user equipment with a preset value.

In one possible implementation, when determining the discontinuous reception parameter of the remote user equipment through the layer 2 user identification of the remote user equipment, the processor is specifically used for: using a discontinuous reception configuration of a cellular network or using a discontinuous reception configuration specified by a network; and by modulo of the layer 2 user identification of the remote user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

In one possible implementation, before the transceiver receives the communication request message sent by the remote user equipment, the processor is further used for: sending a D2D discovery message to the remote user equipment through the transceiver, wherein the D2D discovery message contains related information of a discontinuous reception parameter of the relay user equipment.

In one possible implementation, after both the remote user equipment and the relay user equipment acquire a discontinuous transmission parameter of the other, the processor is further used for: reconfiguring the discontinuous reception parameter of the relay user equipment and/or reconfiguring the discontinuous reception parameter of the remote user equipment; sending the reconfigured discontinuous reception parameter of the relay user equipment and/or the reconfigured discontinuous reception parameter of the remote user equipment to the remote user equipment through the transceiver; and performing information transmission, through the transceiver, with the remote user equipment based on the reconfigured discontinuous reception parameter of the relay user equipment and/or the reconfigured discontinuous reception parameter of the remote user equipment.

A seventh aspect of the implementation of the present disclosure provides a computer storage medium including a set of program codes for executing the method according to any of the implementations of the first aspect of the implementation of the present disclosure.

An eighth aspect of the implementation of the present disclosure provides a computer storage medium including a set of program codes for executing the method according to any of the implementations of the second aspect of the implementation of the present disclosure.

BRIEF DESCRIPTION OF DRAWINGS

In order to explain technical schemes of the implementations of the present disclosure or the related art more clearly, drawings referred to in the description of the implementations will be briefly introduced below. Obviously, the drawings in the following description are only some implementations of the present disclosure. For those of ordinary skill in the art, other drawings may be acquired according to those drawings without paying an inventive effort.

DETAILED DESCRIPTION

Figure 1:
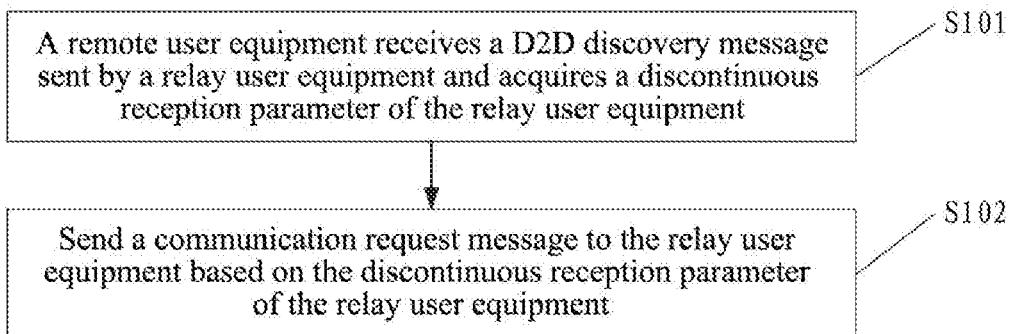
FIG. 1 is a flowchart of a first implementation of a D2D communication method of the present disclosure.

The terms "including" and "having" and any variations thereof in the description and claims of the present disclosure and the drawings are intended to cover non-exclusive inclusion. For example, a process, a method, a system, a product, or an apparatus that includes a series of acts or units is not limited to the listed acts or units, but may optionally further include acts or units not listed, or may optionally further include other acts or units inherent to these processes, methods, products, or apparatuses.

A D2D communication technology refers to a direct communication manner between two peer user nodes. In a distributed network composed of D2D communication users, each user node may send and receive signals and has a function of automatic routing (forwarding messages). Participants of the network share some of their hardware resources, including information processing, storage, and network connectivity capabilities etc. These shared resources provide services and resources to the network and can be directly accessed by another user without passing through an intermediate entity. In a D2D communication network, a user node plays roles of a server and a client at the same time. Users may be aware of existence of one another and form a self-organizing virtual or actual group. In a process of D2D standardization, a PC5 port is introduced to Long Term Evolution (LTE) as a direct communication port of terminals. When researching some technologies with fast information transmission speed, such as a V2X technology, existing D2D technologies cannot meet the needs of V2X communication. Therefore, it is needed to perform enhancement on a basis of the D2D technology based on the PC5 port, in view of characteristics of high-speed movement and numerous connection points of the V2X. This requires a more accurate DRX mechanism. An implementation of the present disclosure provides a D2D communication method, which enables a remote user equipment and a relay user equipment to acquire a DRX parameter of the other party through information interchange, so as to flexibly select time points to send and receive messages according to the DRX parameter of the other party, thereby optimizing system efficiency and reducing power consumption of the D2D link. For convenience of explanation, in the implementation of the present disclosure, a 5G system is taken as an example for description. Those skilled in the art should understand that the implementation of the present disclosure is also applicable to future higher-level communication systems such as 6G and 7G, and the implementation of the present disclosure is not limited thereto.

In a communication system of the implementation of the present disclosure, a remote user equipment (Remote UE), and a relay user equipment (Relay UE) may be included. The User Equipment (UE) may be called a terminal.

The relay user equipment may establish a connection with a network, and the remote user equipment may establish a communication connection with the relay user equipment that has a network connection through a D2D discovery mechanism and a D2D relay communication mechanism to realize relay communication.

The D2D communication method and device according to an implementation of the present disclosure will be described in detail below with reference to the accompanying drawings.

Please refer to FIG. 1, which is a flowchart of a first implementation of a D2D communication method of the present disclosure. In the implementation, the D2D communication method includes acts S101-S102.

In S101, a remote user equipment receives a D2D discovery message sent by a relay user equipment and acquires a discontinuous reception parameter of the relay user equipment.

In order to avoid a situation that information sent by the remote user equipment cannot be normally received by the relay user equipment in a process of establishing a D2D link, the remote user equipment needs to know a DRX parameter of the relay user equipment, and then selects an appropriate time for information transmission according to the DRX parameter of the relay user equipment to ensure that the relay user equipment is in a wake-up state and can normally receive the information sent by the remote user equipment.

Optionally, the D2D discovery message transmitted in a D2D discovery process may be a UE-to-Network relay discovery announcement message or a UE-to-Network relay discovery response message. The remote user equipment may acquire the Discontinuous Reception (DRX) parameter of the relay user equipment from information carried in these D2D discovery messages.

Optionally, the remote user equipment receives the D2D discovery message sent by the relay user equipment and acquires the discontinuous reception parameter of the relay user equipment, which may adopt any of the following manners: the remote user equipment acquires a layer 2 user identification of the relay user equipment contained in the D2D discovery message, and determines the discontinuous reception parameter of the relay user equipment through the layer 2 user identification of the relay user equipment; or determines the discontinuous reception parameter of the relay user equipment through a preset field value contained in the D2D discovery message; or determines the discontinuous reception parameter of the relay user equipment through information of discontinuous reception explicitly broadcast in the D2D discovery message.

Optionally, when acquiring the layer 2 user identification of the relay user equipment, the remote user equipment may acquire the layer 2 user identification of the relay user equipment by receiving a UE-to-Network Relay Discovery Announcement message broadcast by the relay user equipment; or, the remote user equipment may send a UE-to-Network Relay Discovery Solicitation message to the relay user equipment, receive a UE-to-Network Relay Discovery Response message replied by the relay user equipment, and acquire a layer 2 user identification of the relay user equipment from the UE-to-Network Relay Discovery Response message.

When specifically calculating and determining a DRX parameter of the relay user equipment, a discontinuous transmission start offset value (drxStartOffset) may be determined based on any of the following manners according to the layer 2 user identification of the relay user equipment contained in the D2D discovery message: the discontinuous transmission start offset value is equal to the layer 2 user identification of the relay user equipment; the discontinuous transmission start offset value is acquired by modulo of the layer 2 user identification of the relay user equipment with a preset value.

Or, based on the layer 2 user identification of the relay user equipment, a discontinuous reception configuration of a cellular network or a discontinuous reception configuration specified by a network may be used. In these discontinuous configurations, specific parameter information such as a period length and a timer length of DRX are included.

By modulo of the layer 2 user identification of the relay user equipment with a period of discontinuous reception, the drxStartOffset is acquired, wherein the period of the discontinuous reception is a period of discontinuous reception in the discontinuous reception configuration of the cellular network or the discontinuous reception configuration specified by the network.

In addition to the determination of the DRX parameter through the layer 2 user identification of the relay user equipment, the discontinuous reception parameter of the relay user equipment may be determined through a preset field value contained in the D2D discovery message, for example, it is determined through a User Info ID or a Relay Service Code contained in the D2D discovery message. A specific determining manner may refer to the determining process through the layer 2 user identification, which is not repeated here.

Or, the D2D discovery message may be improved to directly broadcast DRX information using the D2D discovery message, so that the remote user equipment may determine the discontinuous reception parameter of the relay user equipment through the information of the discontinuous reception explicitly broadcast in the D2D discovery message.

In S102, a communication request message is sent to the relay user equipment based on the discontinuous reception parameter of the relay user equipment.

In the implementation, the remote user equipment acquires the DRX parameter of the relay user equipment by receiving the D2D discovery message sent by the relay user equipment, so that the communication request message may be sent according to the DRX parameter of the relay user equipment, effectiveness and efficiency of information transmission are improved, the power consumption of the D2D link is reduced at the same time, efficient and stable D2D relay communication is ensured, and a working efficiency of a 5G system is promoted.

Figure 2:
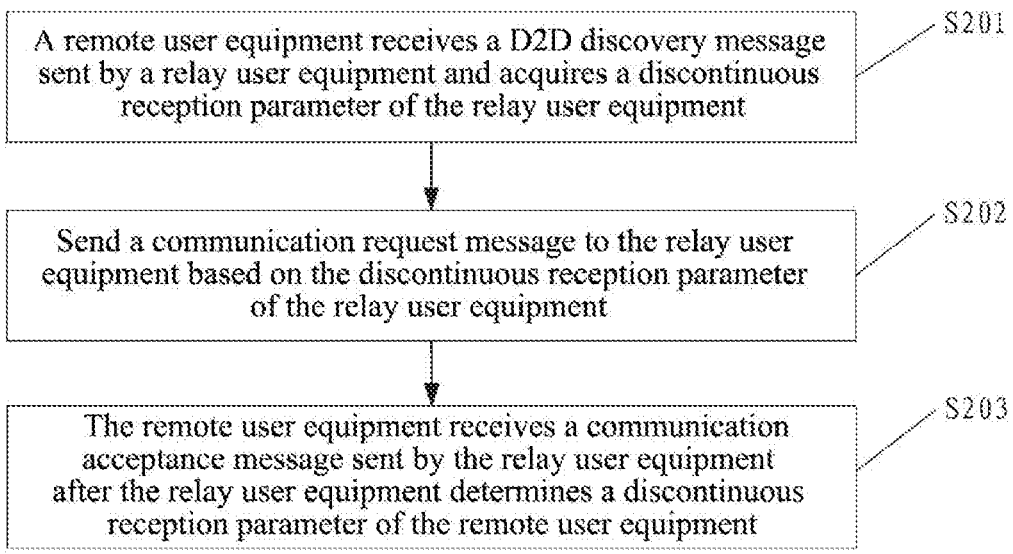
FIG. 2 is a flowchart of a second implementation of a D2D communication method of the present disclosure.

Please refer to FIG. 2, which is a flowchart of a second implementation of a D2D communication method of the present disclosure. In the implementation, the D2D communication method includes acts S201-S203.

In S201, a remote user equipment receives a D2D discovery message sent by a relay user equipment and acquires a discontinuous reception parameter of the relay user equipment.

In S202, a communication request message is sent to the relay user equipment based on the discontinuous reception parameter of the relay user equipment.

The communication request message contains related information of a discontinuous reception parameter of the remote user equipment.

The related information may be a layer 2 user identification of the remote user equipment, or other information contained in the communication request message, such as Sequence Number, User information (User Info), IP Address Configuration (IP Address Config), Maximum Inactivity Period, and Link Local IPv6 Address. The implementation of the present disclosure is not limited thereto.

In S203, the remote user equipment receives a communication acceptance (DIRECT_COMMUNICATION_ACCEPT) message sent by the relay user equipment after the relay user equipment determines the discontinuous reception parameter of the remote user equipment.

The relay user equipment may determine the DRX parameter of the remote user equipment according to the DRX related information of the remote user equipment, and then select an appropriate time point to send the communication acceptance message according to the DRX parameter of the remote user equipment, so that a situation that the remote user equipment cannot normally receive information when in a sleep state is avoided while power consumption is reduced.

In the implementation, the remote user equipment may send a communication request message according to the DRX parameter of the relay user equipment by acquiring the layer 2 user identification of the relay user equipment and acquiring the DRX parameter of the relay user equipment, and the relay user equipment may also acquire the layer 2 user identification and the DRX parameter of the remote user equipment through the communication request message, thus finally realizing that both the remote user equipment and the relay user equipment know the other's DRX parameter. Therefore, information transmission may be performed according to DRX parameters, the effectiveness and efficiency of information transmission are improved and the power consumption of a D2D link is reduced, and the D2D relay communication is ensured to be performed efficiently and stably, and the working efficiency of a 5G system is facilitated to be improved.

Figure 3:
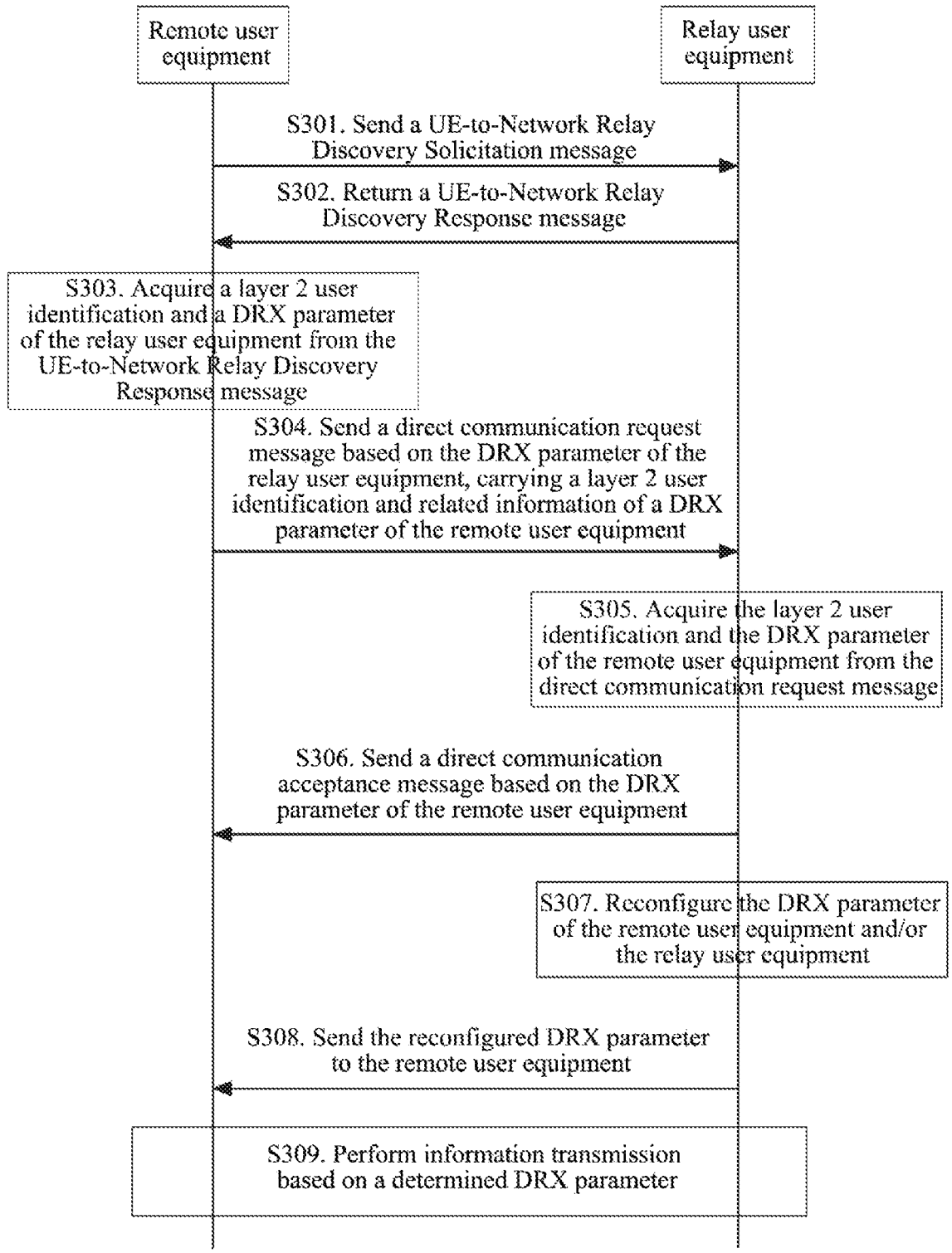
FIG. 3 is a flowchart of a third implementation of a D2D communication method of the present disclosure.

Please refer to FIG. 3, which is a flowchart of a third implementation of a D2D communication method of the present disclosure. In the implementation, the D2D communication method includes acts S301-S309.

In S301, a remote user equipment sends a UE-to-Network Relay Discovery Solicitation message to a relay user equipment.

In S302, the relay user equipment returns a UE-to-Network Relay Discovery Response message.

In S303, the remote user equipment acquires a layer 2 user identification and a DRX parameter of the relay user equipment from the UE-to-Network Relay Discovery Response message.

Optionally, in acts S301 and S302, the relay user equipment may be used to broadcast a UE-to-Network Relay Discovery Announcement instead. The remote user equipment may acquire the Layer 2 user identification of the relay user equipment from the two types of D2D discovery messages and determine the DRX parameter of the relay user equipment according to information contained in the D2D discovery messages.

For example, a discontinuous reception parameter of the relay user equipment may be determined through the layer 2 user identification of the relay user equipment contained in a D2D discovery message; or a discontinuous reception parameter of the relay user equipment may be determined through a preset field value contained in a D2D discovery message; or a discontinuous reception parameter of the relay user equipment may be determined through information of discontinuous reception explicitly broadcast in a D2D discovery message.

When determining the DRX parameter of the relay user equipment according to the layer 2 user identification of the relay user equipment, a discontinuous reception configuration of a cellular network or a discontinuous reception configuration specified by a network may be used.

According to the layer 2 user identification of the relay user equipment contained in the D2D discovery message, and/or the discontinuous reception configuration of the cellular network or the discontinuous reception configuration specified by the network, a discontinuous transmission start offset value is determined based on any of the following manners: the discontinuous transmission start offset value is equal to the layer 2 user identification of the relay user equipment; the discontinuous transmission start offset value is acquired by modulo of the layer 2 user identification of the relay user equipment with a preset value; the discontinuous transmission start offset value is acquired by modulo of the layer 2 user identification of the relay user equipment with a period of discontinuous reception, wherein the period of the discontinuous reception is a period of discontinuous reception in the discontinuous reception configuration of the cellular network or the discontinuous reception configuration specified by the network.

In S304, a communication request (DIRECT_COMMUNICATION_REQUEST) message is sent based on the DRX parameter of the relay user equipment, carrying a layer 2 user identification of the remote user equipment and related information of a DRX parameter of the remote user equipment.

In S305, the layer 2 user identification of the remote user equipment and the DRX parameter of the remote user equipment are acquired from the communication request message.

The manner for acquiring the DRX parameter of the remote user equipment may refer to the manner in act S203 and will not be described here again.

In S306, a communication acceptance (DIRECT_COMMUNICATION_ACCEPT) message is sent based on the DRX parameter of the remote user equipment.

After act S306 is executed, the remote user equipment and the relay user equipment both know the other's layer 2 user identification and DRX parameter, and then act S309 may be executed.

Of course, if there is a better parameter configuration or combination, acts S307-S308 may be executed at this time to reconfigure a DRX parameter of at least one device, thus realizing parameter optimization between the two devices, further improving the working efficiency of a D2D link and reducing power consumption of the D2D link.

In S307, the DRX parameter of the remote user equipment and/or the relay user equipment is reconfigured.

In S308, the reconfigured DRX parameter is sent to the remote user equipment.

S309, information transmission is performed based on a determined DRX parameter.

In the implementation of the present disclosure, a specific D2D discovery process and a D2D connection establishment process between the remote user equipment and the relay user equipment are described. In the whole process, both the remote user equipment and the relay user equipment may acquire a layer 2 user identification and a DRX parameter of the other party through information interchange, so that information transmission is performed based on the acquired parameter, and power consumption of the D2D link is reduced; and the relay user equipment may also optimize a DRX parameter of at least one device, so that power consumption may be further reduced, and the efficiency of the system may be improved at the same time.

Figure 4:
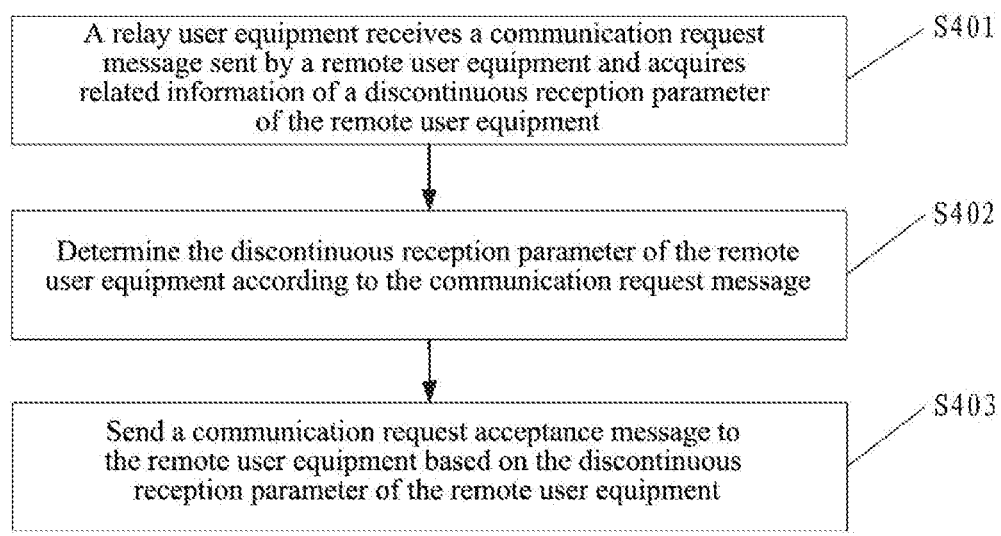
FIG. 4 is a flowchart of a fourth implementation of a D2D communication method of the present disclosure.

Please refer to FIG. 4, which is a flowchart of a fourth implementation of a D2D communication method of the present disclosure. In the implementation, the method includes acts S401-S403.

In S401, a relay user equipment receives a communication request message sent by a remote user equipment and acquires related information of a discontinuous reception parameter of the remote user equipment.

In S402, the discontinuous reception parameter of the remote user equipment is determined according to the communication request message.

In S403, a communication request acceptance message is sent to the remote user equipment based on the discontinuous reception parameter of the remote user equipment.

Optionally, determining the discontinuous reception parameter of the remote user equipment according to the communication request message includes: the relay user equipment acquires a layer 2 user identification of the remote user equipment contained in the communication request message, and determines the discontinuous reception parameter of the remote user equipment through the layer 2 user identification of the remote user equipment; or the discontinuous reception parameter of the remote user equipment is determined through preset information contained in the communication request message; or the discontinuous reception parameter of the remote user equipment is determined through information of discontinuous transmission explicitly broadcast in the communication request message.

Optionally, determining the discontinuous reception parameter of the remote user equipment through the layer 2 user identification of the remote user equipment includes: determining a discontinuous transmission start offset value based on any of the following manners: the discontinuous transmission start offset value is equal to the layer 2 user identification of the remote user equipment; the discontinuous transmission start offset value is acquired by modulo of the layer 2 user identification of the remote user equipment with a preset value.

Optionally, determining the discontinuous reception parameter of the remote user equipment through the layer 2 user identification of the remote user equipment includes: using a discontinuous reception configuration of a cellular network or a discontinuous reception configuration specified by a network; and by modulo of the layer 2 user identification of the remote user equipment with a period of the discontinuous reception, acquiring a discontinuous reception start offset value, wherein the period of the discontinuous reception is a discontinuous reception period in the discontinuous reception configuration of the cellular network or the discontinuous reception configuration specified by the network.

FIG. 4 is a description of an implementation on the relay user equipment side. The specific process may refer to the description of the implementation on the remote user equipment side shown in FIG. 1, which is not repeated here.

Figure 5:
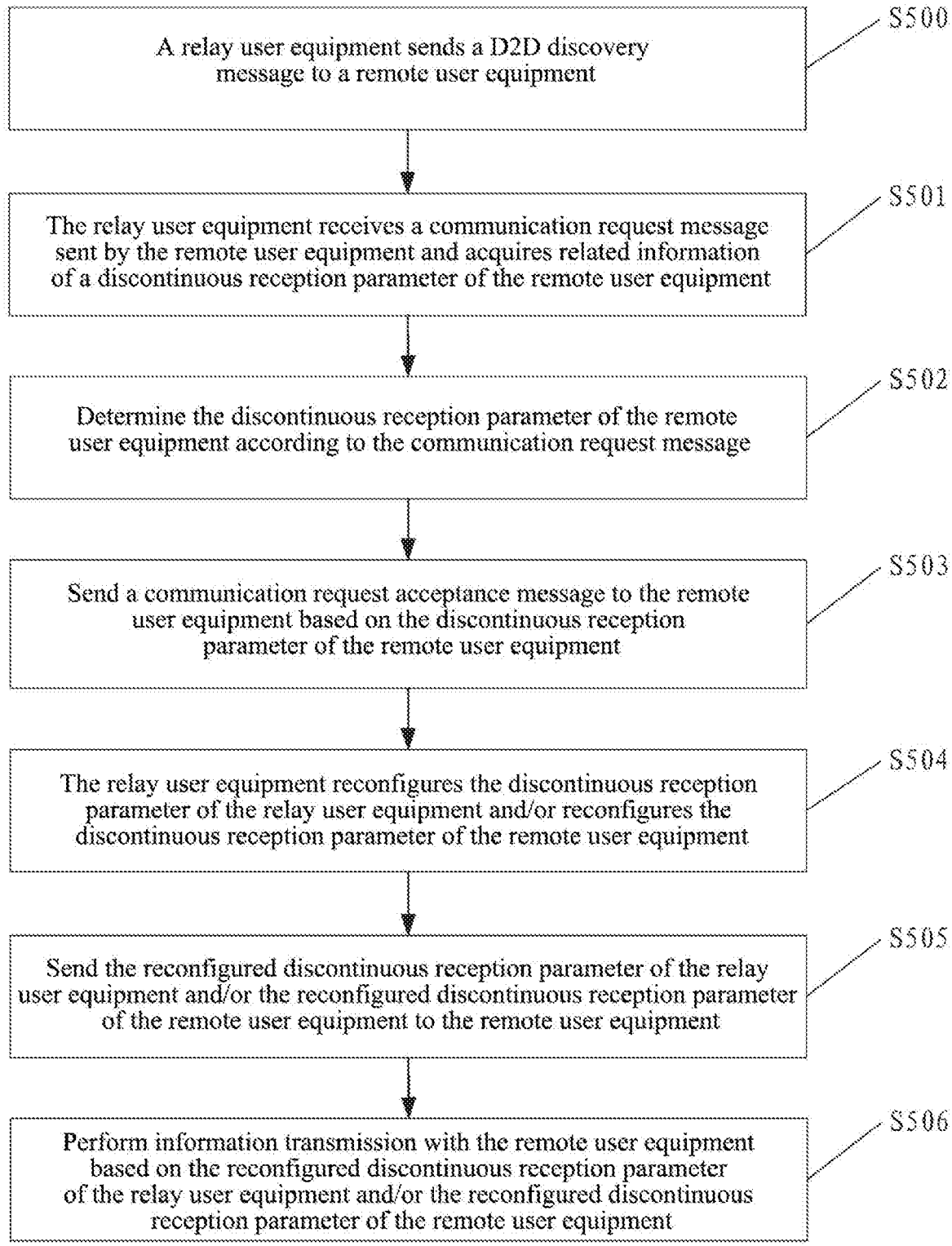
FIG. 5 is a flowchart of a fifth implementation of a D2D communication method of the present disclosure.

Please refer to FIG. 5, which is a flowchart of a fifth implementation of a D2D communication method of the present disclosure. In the implementation, acts S501-S503 are the same as acts S401-S403 in FIG. 4, and will not be described here again. Before act S501, act S500 is further included.

In S500, a relay user equipment sends a D2D discovery message to a remote user equipment.

The D2D discovery message contains related information of a discontinuous reception parameter of the relay user equipment.

After act S503, the method further includes acts S504-S506.

In S504, the relay user equipment reconfigures the discontinuous reception parameter of the relay user equipment and/or reconfigures the discontinuous reception parameter of the remote user equipment.

In S505, the reconfigured discontinuous reception parameter of the relay user equipment and/or the reconfigured discontinuous reception parameter of the remote user equipment is sent to the remote user equipment.

In S506, information transmission is performed with the remote user equipment based on the reconfigured discontinuous reception parameter of the relay user equipment and/or the reconfigured discontinuous reception parameter of the remote user equipment.

FIG. 5 is a description of an implementation on the relay user equipment side. The specific process may refer to the description of an implementation of information interchange between the remote user equipment and the relay user equipment shown in FIGS. 2 and 3, which is not repeated here.

Figure 6:
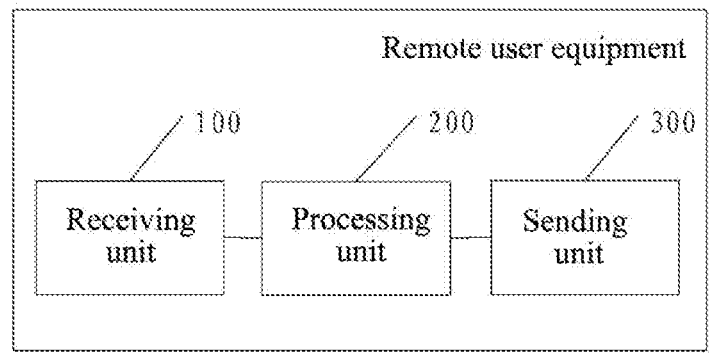
FIG. 6 is a schematic diagram of composition of a first implementation of a remote user equipment of the present disclosure.

Please refer to FIG. 6, which is a schematic diagram of composition of a first implementation of a remote user equipment of the present disclosure. In the implementation, the remote user equipment includes a receiving unit 100, a processing unit 200, and a sending unit 300.

The receiving unit 100 is used for receiving a D2D discovery message sent by a relay user equipment.

The processing unit 200 is used for acquiring a discontinuous reception parameter of the relay user equipment according to the D2D discovery message.

The sending unit 300 is used for sending a communication request message to the relay user equipment based on the discontinuous reception parameter of the relay user equipment.

Optionally, when acquiring the discontinuous reception parameter of the relay user equipment, the processing unit 200 is specifically used for: acquiring a layer 2 user identification of the relay user equipment contained in the D2D discovery message, and determining the discontinuous reception parameter of the relay user equipment through the layer 2 user identification of the relay user equipment; or determining the discontinuous reception parameter of the relay user equipment through a preset field value contained in the D2D discovery message; or determining the discontinuous reception parameter of the relay user equipment through information of the discontinuous reception explicitly broadcast in the D2D discovery message.

Optionally, when acquiring the layer 2 user identification of the relay user equipment contained in the D2D discovery message, the receiving unit 100 is specifically used for: receiving a UE-to-Network Relay Discovery Announcement message broadcast by the relay user equipment, and acquiring the layer 2 user identification of the relay user equipment; or the sending unit 300 is specifically used for sending a UE-to-Network Relay Discovery Solicitation message to the relay user equipment, and the receiving unit 100 is specifically used for receiving a UE-to-Network Relay Discovery Response message replied by the relay user equipment and acquiring the layer 2 user identification of the relay user equipment.

Optionally, when determining the discontinuous reception parameter of the relay user equipment through the layer 2 user identification of the relay user equipment, the processing unit 200 is specifically used for: determining a discontinuous transmission start offset value based on any of the following manners: the discontinuous transmission start offset value is equal to the layer 2 user identification of the relay user equipment; the discontinuous transmission start offset value is acquired by modulo of the layer 2 user identification of the relay user equipment with a preset value.

Optionally, when determining the discontinuous reception parameter of the relay user equipment through the layer 2 user identification of the relay user equipment, the processing unit 200 is specifically used for: using a discontinuous reception configuration of a cellular network or using a discontinuous reception configuration specified by a network; by modulo of the layer 2 user identification of the relay user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

Optionally, the communication request message includes related information of a discontinuous reception parameter of the remote user equipment; and the receiving unit 100 is further used for receiving a communication acceptance message sent by the relay user equipment after the relay user equipment determines the discontinuous reception parameter of the remote user equipment.

Figure 7:
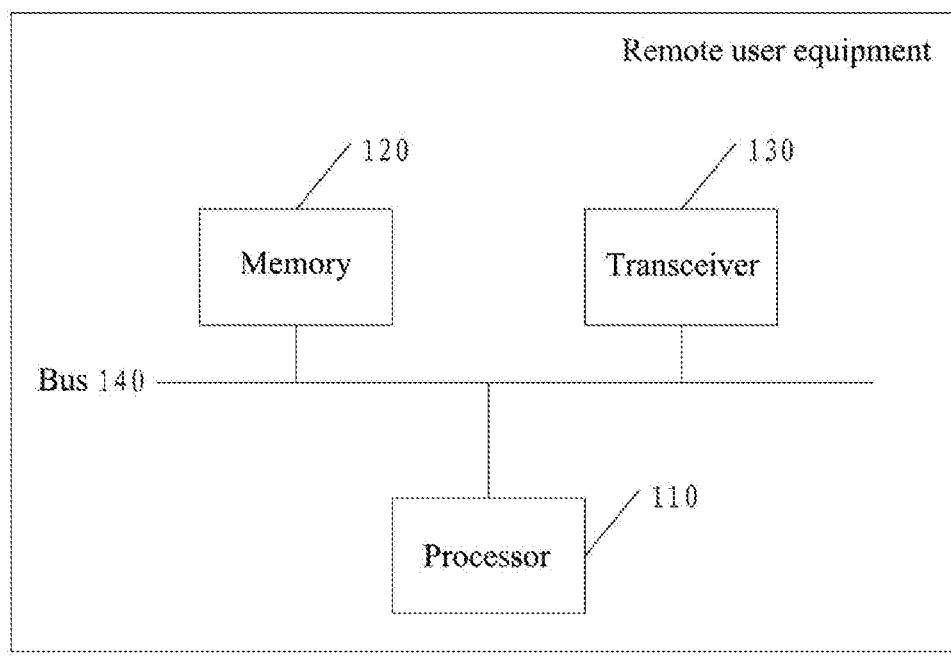
FIG. 7 is a schematic diagram of composition of a second implementation of a remote user equipment of the present disclosure.

Please refer to FIG. 7, which is a schematic diagram of composition of a second implementation of a remote user equipment of the present disclosure. In the implementation, the remote user equipment includes: a processor 110, a memory 120, a transceiver 130, and a bus 140, wherein the processor 110, the memory 120, and the transceiver 130 are connected through the bus 140, wherein the transceiver 130 is used for sending and receiving signals and communicating with a relay user equipment, the memory 120 is used for storing a set of program codes, and the processor 110 is used for calling the program codes stored in the memory 120 to perform the following operations: receiving a D2D discovery messages sent by the relay user equipment through the transceiver 130, and acquiring a discontinuous reception parameter of the relay user equipment; sending a communication request message to the relay user equipment through the transceiver 130 based on the discontinuous reception parameter of the relay user equipment.

Optionally, when acquiring the discontinuous reception parameter of the relay user equipment, the processor 110 is specifically used for: acquiring a layer 2 user identification of the relay user equipment contained in the D2D discovery message, and determining a discontinuous reception parameter of the relay user equipment through the layer 2 user identification of the relay user equipment; or determining a discontinuous reception parameter of the relay user equipment through a preset field value contained in the D2D discovery message; or determining the discontinuous reception parameter of the relay user equipment through information of discontinuous reception explicitly broadcast in the D2D discovery message.

Optionally, when acquiring the layer 2 user identification of the relay user equipment contained in the D2D discovery message, the processor 110 is specifically used for: receiving, through the transceiver, a UE-to-Network Relay Discovery Announcement message broadcast by the relay user equipment and acquiring the layer 2 user identification of the relay user equipment; or sending a UE-to-Network Relay Discovery Solicitation message to the relay user equipment through the transceiver, receiving a UE-to-Network Relay Discovery Response message replied by the relay user equipment, and acquiring the layer 2 user identification of the relay user equipment.

Optionally, when determining the discontinuous reception parameter of the relay user equipment through the layer 2 user identification of the relay user equipment, the processor 110 is specifically used for: determining a discontinuous transmission start offset value based on any of the following manners: the discontinuous transmission start offset value is equal to the layer 2 user identification of the relay user equipment; the discontinuous transmission start offset value is acquired by modulo of the layer 2 user identification of the relay user equipment with a preset value.

Optionally, when determining the discontinuous reception parameter of the relay user equipment through the layer 2 user identification of the relay user equipment, the processor 110 is specifically used for: using a discontinuous reception configuration of a cellular network or using a discontinuous reception configuration specified by a network; by modulo of the layer 2 user identification of the relay user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

Optionally, the communication request message includes related information of a discontinuous reception parameter of the remote user equipment.

The processor 110 is further used for: receiving, through the transceiver, a communication acceptance message sent by the relay user equipment after the relay user equipment determines the discontinuous reception parameter of the remote user equipment.

Figure 8:
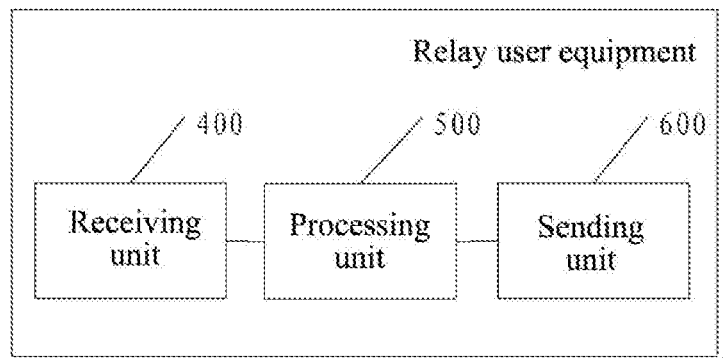
FIG. 8 is a schematic diagram of composition of a first implementation of a relay user equipment of the present disclosure.

Please refer to FIG. 8, which is a schematic diagram of composition of a first implementation of a relay user equipment of the present disclosure. In the implementation, the relay user equipment includes: a receiving unit 400, used for receiving a communication request message sent by a remote user equipment and acquire related information of a discontinuous reception parameter of the remote user equipment; a processing unit 500, used for determining the discontinuous reception parameter of the remote user equipment according to the communication request message; and a sending unit 600, used for sending a communication request acceptance message to the remote user equipment based on the discontinuous reception parameter of the remote user equipment.

Optionally, when determining the discontinuous reception parameter of the remote user equipment according to the communication request message, the processing unit 500 is specifically used for: acquiring a layer 2 user identification of the remote user equipment contained in the communication request message, and determining the discontinuous reception parameter of the remote user equipment through the layer 2 user identification of the remote user equipment; or determining the discontinuous reception parameter of the remote user equipment through preset information contained in the communication request message; or determining the discontinuous reception parameter of the remote user equipment through information of discontinuous transmission explicitly broadcast in the communication request message.

Optionally, when determining the discontinuous reception parameter of the remote user equipment through the layer 2 user identification of the remote user equipment, the processing unit 500 is specifically used for: determining a discontinuous transmission start offset value based on any of the following manners: the discontinuous transmission start offset value is equal to the layer 2 user identification of the remote user equipment; the discontinuous transmission start offset value is acquired by modulo of the layer 2 user identification of the remote user equipment with a preset value.

Optionally, when determining the discontinuous reception parameter of the remote user equipment through the layer 2 user identification of the remote user equipment, the processing unit 500 is specifically used for: using a discontinuous reception configuration of a cellular network or using a discontinuous reception configuration specified by a network; by modulo of the layer 2 user identification of the remote user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

Optionally, before the receiving unit receives the communication request message sent by the remote user equipment, the sending unit 600 is further used for sending a D2D discovery message to the remote user equipment, wherein the D2D discovery message contains related information of the discontinuous reception parameter of the relay user equipment.

Optionally, after both the remote user equipment and the relay user equipment acquire the discontinuous transmission parameter of the other party, the processing unit 500 is further used for reconfiguring the discontinuous reception parameter of the relay user equipment and/or reconfiguring the discontinuous reception parameter of the remote user equipment.

The sending unit 400 is further used for sending the reconfigured discontinuous reception parameter of the relay user equipment and/or the reconfigured discontinuous reception parameter of the remote user equipment to the remote user equipment.

The receiving unit 500 and the sending unit 400 are further used for performing information transmission with the remote user equipment based on the reconfigured discontinuous reception parameter of the relay user equipment and/or the reconfigured discontinuous reception parameter of the remote user equipment.

Figure 9:
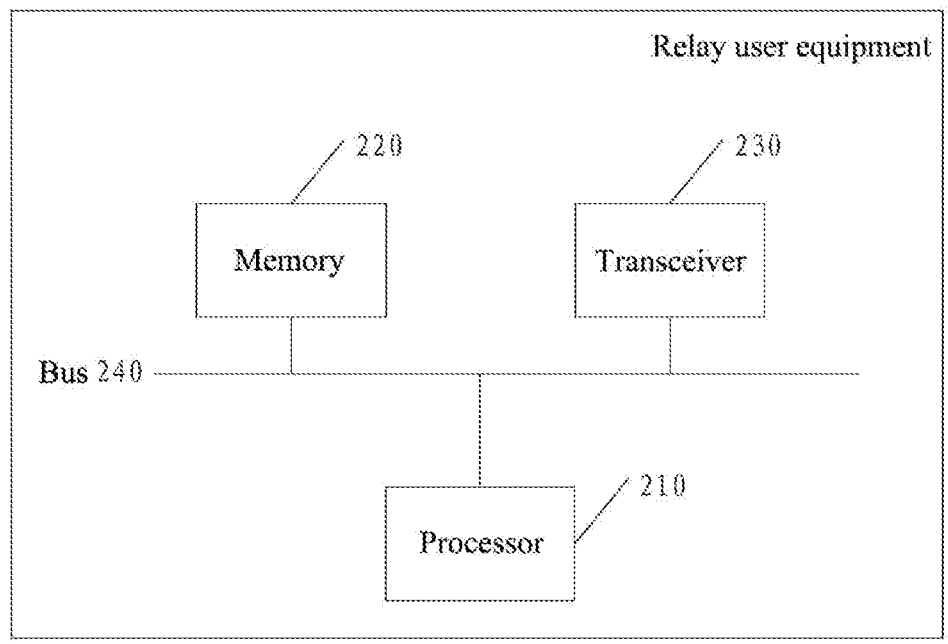
FIG. 9 is a schematic diagram of composition of a second implementation of a relay user equipment of the present disclosure.

Please refer to FIG. 9, which is a schematic diagram of composition of a second implementation of a relay user equipment of the present disclosure. In the implementation, the relay user equipment includes: a processor 210, a memory 220, a transceiver 230, and a bus 240, wherein the processor 210, the memory 220, and the transceiver 230 are connected through the bus 240, wherein the transceiver 230 is used for receiving and sending signals and communicating with a remote user equipment, the memory 220 is used for storing a set of program codes, and the processor 210 is used for calling the program codes stored in the memory 220 to perform the following operations: receiving a communication request message sent by the remote user equipment through the transceiver 230, and acquiring related information of a discontinuous reception parameter of the remote user equipment; determining the discontinuous reception parameter of the remote user equipment according to the communication request message; and sending a communication request acceptance message to the remote user equipment through the transceiver 230 based on the discontinuous reception parameter of the remote user equipment.

Optionally, when determining the discontinuous reception parameter of the remote user equipment according to the communication request message, the processor 210 is specifically used for: acquiring a layer 2 user identification of the remote user equipment contained in the communication request message, and determining a discontinuous reception parameter of the remote user equipment through the layer 2 user identification of the remote user equipment; or determining the discontinuous reception parameter of the remote user equipment through preset information contained in the communication request message; or determining the discontinuous reception parameter of the remote user equipment through information of discontinuous transmission explicitly broadcast in the communication request message.

Optionally, when determining the discontinuous reception parameter of the remote user equipment through the layer 2 user identification of the remote user equipment, the processor 210 is specifically used for: determining a discontinuous transmission start offset value based on any of the following manners: the discontinuous transmission start offset value is equal to the layer 2 user identification of the remote user equipment; the discontinuous transmission start offset value is acquired by modulo of the layer 2 user identification of the remote user equipment with a preset value.

Optionally, when determining the discontinuous reception parameter of the remote user equipment through the layer 2 user identification of the remote user equipment, the processor 210 is specifically used for: using a discontinuous reception configuration of a cellular network or using a discontinuous reception configuration specified by a network; by modulo of the layer 2 user identification of the remote user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

Optionally, before the transceiver receives the communication request message sent by the remote user equipment, the processor 210 is further used for: sending a D2D discovery message to the remote user equipment through the transceiver, wherein the D2D discovery message contains related information of the discontinuous reception parameter of the relay user equipment.

Optionally, after the remote user equipment and the relay user equipment both acquire a discontinuous transmission parameter of the other, the processor 210 is further used for: reconfiguring the discontinuous reception parameter of the relay user equipment and/or reconfiguring the discontinuous reception parameter of the remote user equipment; sending, through the transceiver 230, the reconfigured discontinuous reception parameter of the relay user equipment and/or the reconfigured discontinuous reception parameter of the remote user equipment to the remote user equipment; and performing information transmission, through the transceiver 230, with the remote user equipment based on the reconfigured discontinuous reception parameter of the relay user equipment and/or the reconfigured discontinuous reception parameter of the remote user equipment.

The remote user equipment introduced in the implementation of the present disclosure may be used for implementing some or all of the processes in the implementation of the method described in connection with FIGS. 1-3 and performing some or all of the functions in the apparatus implementation described in connection with FIG. 6. The relay user equipment introduced in the implementation of the present disclosure may be used for implementing some or all of the processes in the implementation of the method described in connection with FIGS. 4-5 and performing some or all of the functions in the apparatus implementation described in connection with FIG. 8, which will not be described again here.

Those skilled in the art may clearly understand that for convenience and conciseness of description, specific working processes of the device and unit described above may refer to the corresponding processes in the method implementations, and details are not described herein again.

It shall also be understood that, in various implementations of the present disclosure, values of sequence numbers of the processes do not indicate an order of execution, and the order of execution of various processes should be determined by their functions and internal logics, and should not constitute any limitation on the execution processes of the implementations of the present disclosure.

In addition, the terms "system" and "network" are often used interchangeably herein. The term "and/or" in this document is merely an association relationship describing associated objects, indicating that there may be three relationships, for example, A and/or B may indicate three situations: A alone, A and B, and B alone. In addition, the symbol "/" in the document generally indicates that objects before and after the symbol "/" have an "or" relationship.

In the implementation provided in the present disclosure, it should be understood that "B corresponding to A" means that B is associated with A, and B may be determined according to A. However, it should be further understood that determining B according to A does not mean B is determined according to A only, but B may be determined according to A and/or other information.

In several implementations provided by the present disclosure, it should be understood that the disclosed device and method may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present disclosure may be integrated in one processing unit, or various functional units may be physically present separately, or two or more units may be integrated into one unit.

Those of ordinary skill in the art will understand that various aspects of the present disclosure, or possible implementations of various aspects, may be embodied as systems, methods, or computer program products. Furthermore, various aspects of the present disclosure, or possible implementations of various aspects, may take a form of a computer program product, which refers to computer readable program codes stored in a computer readable medium.

The computer readable medium may be a computer readable data medium or a computer readable storage medium. The computer readable storage medium include, but is not limited to, electronic, magnetic, optical, electromagnetic, infrared, or semiconductor systems, devices, or apparatuses, or any suitable combination of the foregoing, such as a random access memory (RAM), a read-only memory (ROM), an erasable programmable read-only memory (EPROM or flash memory), a optical fiber, and a portable read-only memory (CD-ROM).

The processor in the computer reads the computer readable program codes stored in the computer readable medium so that the processor may perform the functional actions specified in each act or combination of acts in the flowchart; generating apparatuses for performing functional actions specified in each block or combination of blocks of the block diagram.

The computer readable program codes may be executed entirely on a user's computer, partially on the user's computer, as a separate software package, partially on the user's own computer and partially on a remote computer, or entirely on a remote computer or server. It should also be noted that in some alternative implementations, the functions noted in each act of the flowchart or block in the block diagram may not occur in the order noted in the diagram. For example, depending on the functionality involved, two acts shown in succession, or two blocks may in fact be executed substantially simultaneously, or the blocks may sometimes be executed in the reverse order.

What are described above are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be determined by the protection scope of the claims.

What is claimed is:

1. A method for D2D communication, comprising:
   receiving, by a remote user equipment, a D2D discovery message sent by a relay user equipment, and acquiring a discontinuous reception parameter of the relay user equipment; and
   sending a communication request message to the relay user equipment based on the discontinuous reception parameter of the relay user equipment,
   wherein the receiving, by the remote user equipment, the D2D discovery message sent by the relay user equipment, and acquiring the discontinuous reception parameter of the relay user equipment, comprises one of:
   acquiring, by the remote user equipment, a layer 2 user identification of the relay user equipment contained in the D2D discovery message, and determining the discontinuous reception parameter of the relay user equipment through the layer 2 user identification of the relay user equipment;
   determining the discontinuous reception parameter of the relay user equipment through a preset field value contained in the D2D discovery message; or
   determining the discontinuous reception parameter of the relay user equipment through information of discontinuous reception explicitly broadcast in the D2D discovery message,
   wherein the determining the discontinuous reception parameter of the relay user equipment through the layer 2 user identification of the relay user equipment, comprises:
   determining a discontinuous transmission start offset value based on any of the following manners:
   the discontinuous transmission start offset value is equal to the layer 2 user identification of the relay user equipment; or
   the discontinuous transmission start offset value is acquired by modulo of the layer 2 user identification of the relay user equipment with a preset value.

2. The method according to claim 1, wherein the acquiring, by the remote user equipment, the layer 2 user identification of the relay user equipment contained in the D2D discovery message, comprises:
   receiving, by the remote user equipment, a UE-to-Network Relay Discovery Announcement message broadcast by the relay user equipment, and acquiring the layer 2 user identification of the relay user equipment; or
   sending, by the remote user equipment, a UE-to-Network Relay Discovery Solicitation message to the relay user equipment, receiving a UE-to-Network Relay Discovery Response message replied by the relay user equipment, and acquiring the layer 2 user identification of the relay user equipment.

3. The method according to claim 2, wherein the determining the discontinuous reception parameter of the relay user equipment through the layer 2 user identification of the relay user equipment, comprises:
   using a discontinuous reception configuration of a cellular network or using a discontinuous reception configuration specified by a network; and
   by modulo of the layer 2 user identification of the relay user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

4. The method according to claim 1, wherein the communication request message contains related information of a discontinuous reception parameter of the remote user equipment; and
   the method further comprises:
   receiving, by the remote user equipment, a communication acceptance message sent by the relay user equipment after the relay user equipment determines the discontinuous reception parameter of the remote user equipment.

5. A remote user equipment, comprising:
   a processor, a memory, a transceiver, and a bus, wherein the processor, the memory, and the transceiver are connected through the bus, wherein the transceiver is used for receiving and sending signals and communicating with a relay user equipment, the memory is used for storing a group of program codes, and the processor is used for calling the program codes stored in the memory to perform the following operations:

receiving a D2D discovery message sent by the relay user equipment through the transceiver to acquire a discontinuous reception parameter of the relay user equipment; and sending a communication request message to the relay user equipment through the transceiver based on the discontinuous reception parameter of the relay user equipment, wherein when acquiring the discontinuous reception parameter of the relay user equipment, the processor is specifically used for one of:

acquiring a layer 2 user identification of the relay user equipment contained in the D2D discovery message, and determining the discontinuous reception parameter of the relay user equipment through the layer 2 user identification of the relay user equipment, determining the discontinuous reception parameter of the relay user equipment through a preset field value contained in the D2D discovery message; or determining the discontinuous reception parameter of the relay user equipment through information of discontinuous reception explicitly broadcast in the D2D discovery message, wherein when determining the discontinuous reception parameter of the relay user equipment through the layer 2 user identification of the relay user equipment, the processor is specifically used for:

determining a discontinuous transmission start offset value based on any of the following manners:

the discontinuous transmission start offset value is equal to the layer 2 user identification of the relay user equipment; or the discontinuous transmission start offset value is acquired by modulo of the layer 2 user identification of the relay user equipment with a preset value.

6. The remote user equipment according to claim 5, wherein when acquiring the layer 2 user identification of the relay user equipment contained in the D2D discovery message, the processor is specifically used for:

receiving a UE-to-Network Relay Discovery Announcement message broadcast by the relay user equipment through the transceiver and acquiring the layer 2 user identification of the relay user equipment; or sending a UE-to-Network Relay Discovery Solicitation message to the relay user equipment through the transceiver, receiving a UE-to-Network Relay Discovery Response message replied by the relay user equipment, and acquiring the layer 2 user identification of the relay user equipment.

7. The remote user equipment according to claim 6, wherein when determining the discontinuous reception parameter of the relay user equipment through the layer 2 user identification of the relay user equipment, the processor is specifically used for:

using a discontinuous reception configuration of a cellular network or using a discontinuous reception configuration specified by a network; and by modulo of the layer 2 user identification of the relay user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

8. The remote user equipment according to claim 5, wherein the communication request message contains related information of a discontinuous reception parameter of the remote user equipment; and the processor is further used for:

receiving, through the transceiver, a communication acceptance message sent by the relay user equipment after the relay user equipment determines the discontinuous reception parameter of the remote user equipment.

9. A relay user equipment, comprising:

a processor, a memory, a transceiver, and a bus, wherein the processor, the memory, and the transceiver are connected through the bus, wherein the transceiver is used for receiving and sending signals and communicating with a remote user equipment, the memory is used for storing a group of program codes, and the processor is used for calling the program codes stored in the memory to perform the following operations:

receiving a communication request message sent by the remote user equipment through the transceiver, and acquiring related information of a discontinuous reception parameter of the remote user equipment;

determining the discontinuous reception parameter of the remote user equipment according to the communication request message; and sending a communication request acceptance message to the remote user equipment through the transceiver based on the discontinuous reception parameter of the remote user equipment, wherein when determining the discontinuous reception parameter of the remote user equipment according to the communication request message, the processor is specifically used for one of:

acquiring a layer 2 user identification of the remote user equipment contained in the communication request message, and determining the discontinuous reception parameter of the remote user equipment through the layer 2 user identification of the remote user equipment;

determining the discontinuous reception parameter of the remote user equipment through preset information contained in the communication request message; or determining the discontinuous reception parameter of the remote user equipment through information of discontinuous transmission explicitly broadcast in the communication request message, wherein when determining the discontinuous reception parameter of the remote user equipment through the layer 2 user identification of the remote user equipment, the processor is specifically used for:

determining a discontinuous transmission start offset value based on any of the following manners:

the discontinuous transmission start offset value is equal to the layer 2 user identification of the remote user equipment; or the discontinuous transmission start offset value is acquired by modulo of the layer 2 user identification of the remote user equipment with a preset value.

10. The relay user equipment according to claim 9, wherein when determining the discontinuous reception parameter of the remote user equipment through the layer 2 user identification of the remote user equipment, the processor is specifically used for:
  using a discontinuous reception configuration of a cellular network or using a discontinuous reception configuration specified by a network; and
  by modulo of the layer 2 user identification of the remote user equipment with a period of the discontinuous reception, acquiring a discontinuous reception start offset value, wherein the period of the discontinuous reception is a period of discontinuous reception in the discontinuous reception configuration of the cellular network or the discontinuous reception configuration specified by the network.

11. The relay user equipment according to claim 9, wherein the processor is further used for:
  before the transceiver receives the communication request message sent by the remote user equipment, sending a D2D discovery message to the remote user equipment through the transceiver, wherein the D2D discovery message contains related information of a discontinuous reception parameter of the relay user equipment.

12. The relay user equipment according to claim 11, wherein the processor is further used for:
  after both the remote user equipment and the relay user equipment acquire a discontinuous transmission parameter of the other:
  reconfiguring the discontinuous reception parameter of the relay user equipment or reconfiguring the discontinuous reception parameter of the remote user equipment;
  sending the reconfigured discontinuous reception parameter of the relay user equipment or the reconfigured discontinuous reception parameter of the remote user equipment to the remote user equipment through the transceiver; and
  performing information transmission, through the transceiver, with the remote user equipment based on the reconfigured discontinuous reception parameter of the relay user equipment or the reconfigured discontinuous reception parameter of the remote user equipment.

13. A non-transitory computer storage medium, including a set of program codes for executing the method according to claim 1.

14. The non-transitory computer storage medium of claim 13, wherein the receiving, by the remote user equipment, the D2D discovery message sent by the relay user equipment, and acquiring the discontinuous reception parameter of the relay user equipment, comprises one of:
  acquiring, by the remote user equipment, a layer 2 user identification of the relay user equipment contained in the D2D discovery message, and determining the discontinuous reception parameter of the relay user equipment through the layer 2 user identification of the relay user equipment;
  determining the discontinuous reception parameter of the relay user equipment through a preset field value contained in the D2D discovery message; or
  determining the discontinuous reception parameter of the relay user equipment through information of discontinuous reception explicitly broadcast in the D2D discovery message.

* * * * *